United States Patent Office

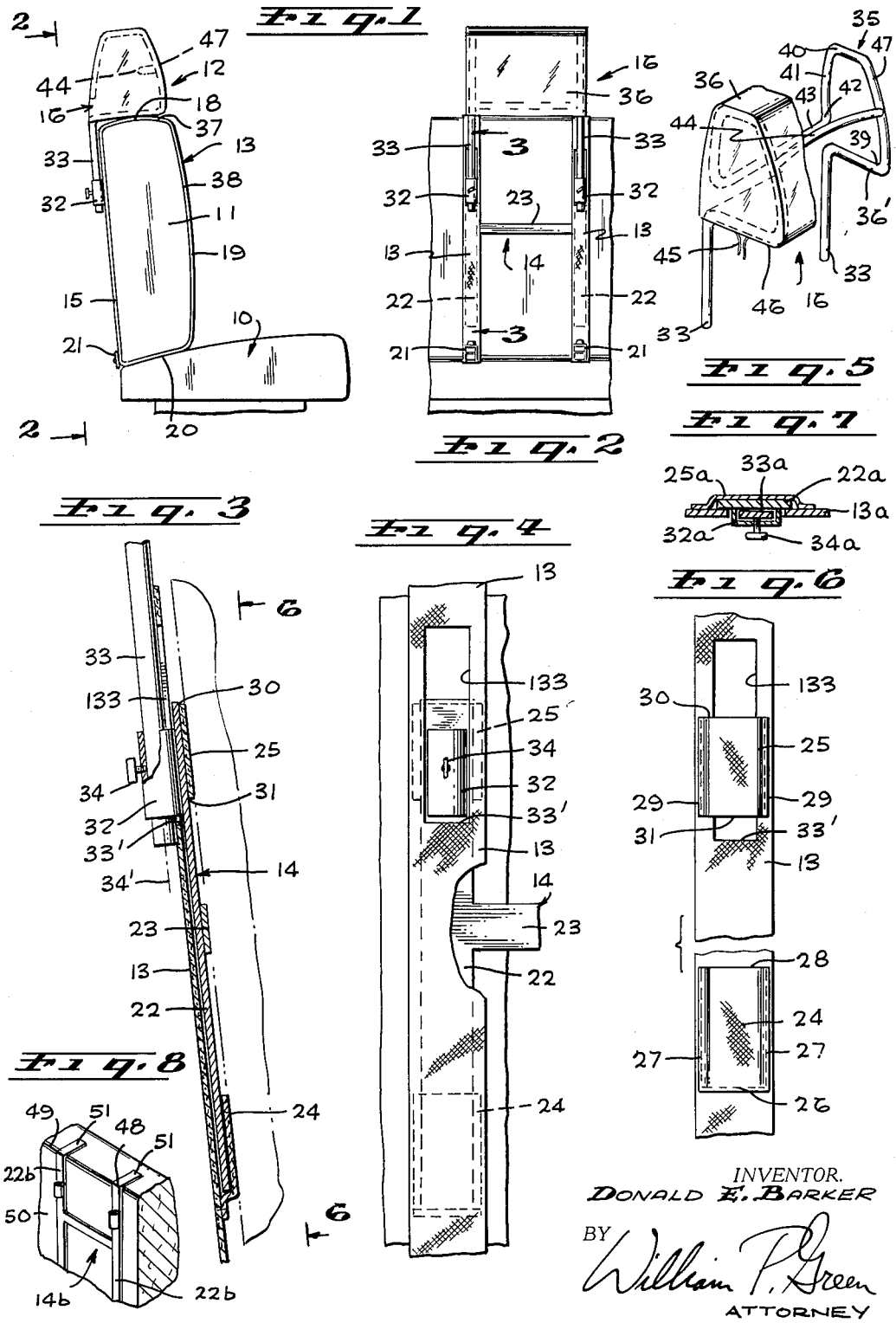

3,254,918
Patented June 7, 1966

3,254,918
AUTOMOBILE HEAD REST OR THE LIKE
Donald E. Barker, 9352 Balcom Ave., Northridge, Calif.
Filed May 25, 1964, Ser. No. 369,928
5 Claims. (Cl. 297—397)

This invention relates to a type of device which is adapted to be connected to a seat back in an automobile or other motor vehicle, for the purpose of mounting a head rest or other unit in a predetermined position relative to the seat back. The invention will be described primarily as applied to the mounting of head rests, and in some of its aspects is especially adapted for this particular use. Some features of the invention have been disclosed and claimed in my copending application Serial No. 327,270, filed December 2, 1963, on "Safety Head Rest."

A unit embodying the invention includes at least one flexible strap (preferably two such straps), which are detachably connectible to the seat back, and which carry at the rear side of the seat back a more rigid frame structure to which the head rest or other mounted unit is connected. The relatively rigid frame is thus located at a position at which it is not contacted by a person in the seat, with only the flexible strap or straps being received at the front of the seat back. The passenger can then lean backwardly against these straps with no discomfort such as would occur if the frame were mounted at the forward side of the seat back.

A major object of the present invention is to provide a unique arrangement for connecting such a frame structure to the straps in a manner allowing very easy initial assembly of these parts together, and easy detachment of the frame from the straps if for any reason it becomes desirable to replace either the frame or straps. This capacity for disassembly also facilitates the use with a particular frame structure of any of different colors of straps, to match the upholstery of a particular automobile without the necessity for stocking as many frames as straps. At the time of sale, straps of the desired color may be connected easily to a frame structure which is usable with any color strap, to thereby provide a purchaser with a strap color matching his particular interior upholstery.

To attain these results, I may form the straps to have pockets which are capable of removably receiving portions of the frame in the assembled condition. More particularly, the frame may have upwardly and downwardly projecting elements which are receivable within a pair of upper and lower pockets respectively formed in the hidden side of the flexible strap or straps, and which in the assembled condition confine and retain the frame projections very positively and in a manner preventing accidental detachment of the frame from the straps. Further, these straps may have apertures through which there project sockets or other connector elements for attachment to the head rest, in a relation such that the extension of these connector elements through the apertures additionally increases the effectiveness with which the frame is attached to and interlocked with the straps.

The above and other features and objects of the invention will be better understood from the following detailed description of the typical embodiments illustrated in the accompanying drawing, in which:

FIG. 1 is a side view of an automobile seat showing a head rest constructed in accordance with the invention mounted to the seat back;

FIG. 2 is a view taken on line 2—2 of FIG. 1;

FIG. 3 is an enlarged fragmentary vertical section taken on line 3—3 of FIG. 2;

FIG. 4 is an enlargement of a portion of FIG. 2;

FIG. 5 is a perspective view of the head rest proper and the cover therefor;

FIG. 6 is a view on line 6—6 of FIG. 3;

FIG. 7 is a horizontal section through a variation having a socket of rectangular cross section; and FIG. 8 is a perspective of another form of the invention.

Referring first to FIG. 1, I have represented at 10 a conventional automobile seat having the usual seat back portion 11 to which there is mounted a head rest assembly 12 constructed in accordance with the invention. Assembly 12 includes two flexible straps 13, which hold a more rigid frame 14 against the rear surface 15 of seat back 11. To frame 14, there is in turn mounted the head rest proper 16, which is received above the seat back at a location to be contacted by the head of a passenger, and support the passenger's head against rearward movement.

Each of the straps 13 may be formed of any conventional strap material, such as woven material of the type utilized in forming seat belts or the like. Each strap is long enough to extend from a location 18 (FIG. 1) upwardly along the rear side 15 of the seat back, then forwardly at 18 over the top of the seat back, and downwardly at 19 in front of the seat back, to ultimately pass rearwardly at 20 for connection to the other end of the strap. One of the strap ends may carry a buckle 21, to which the other end (typically that designated 20), is connectible detachably and in an adjusting relationship enabling the strap to be tightened in the illustrated condition about the seat back.

Frame 14 may be formed of a suitable material having sufficient stiffness to properly support the head rest 16, and for this purpose may typically be made of an appropriate rigid metal, such as aluminum, steel, or the like. As seen best in FIG. 2, the frame may be of essentially "H" shape, having two parallel generally vertical members 22 interconnected by a generally horizontal and perpendicular cross piece 23. Elements 22 and 23 may be formed from a single piece of sheet material, or may be formed of three separate pieces suitably riveted or welded, or otherwise rigidly secured together at the opposite ends of cross piece 23. Preferably the three elements 22, 22 and 23 are of flat material, to be easily received against the rear surface 15 of the seat back, and of course desirably lie in a common plane. In use, one of the essentially vertical members 22 is received directly in front of a first of the straps 13, between that strap and surface 15 of the seat back, while the second of the generally vertical members 22 is similarly received in front of the second strap 13, and between that strap and surface 15 of the seat back. The cross piece 23 then extends transversely between the two straps.

With reference now to FIG. 3, it is noted that each of the straps 13 carries at its forward side a lower pocket 24 within which the lower end of the corresponding generally vertical frame member 22 is received, and an upper pocket 25 for similarly receiving the upper end of the same member 22. The two pockets 24 and 25 are formed of flexible cloth or other material, typically the same material of which straps 13 are formed, and are appropriately peripherally stitched to the strap. For instance, the lower piece of sheet material forming bottom pocket 24 is stitched along its bottom edge 26 and two vertical side edges 27 to strap 13 (see FIG. 4) to form a pocket having an open upper end 28 (FIGS. 3 and 4). The material forming top pocket 25 may be stitched to the strap only along the opposite side edges 29 of the pocket, to be open at both the upper and lower edges 30 and 31, so that the upper end of member 22 may be extended upwardly entirely through and out the upper end of pocket 25 during initial assembly of the unit, in order to facilitate movement of the lower end of the same frame element 22 downwardly into bottom pocket 24.

Each of the vertical frame elements 22 may carry at its rear side a socket part 32 which may consist simply of a generally vertically extending tube which is riveted, welded, or otherwise rigidly secured to the rear side of member 22, and projects rearwardly therefrom through aperture 33′ formed in the associated strap 13. Tube or socket 32 receives the lower end of one of two mounting arms 33 of the head rest proper 16, which arms may be in the form of a tube fitting closely within socket 32 and retained in adjusted position therein by tightening of a typically hand tightenable screw 34. Socket 32 desirably has its axis 34′ disposed parallel to the plane of the sheet metal forming frame elements 22 and 23, and is mounted to project sufficiently behind frame elements 22 to allow reception of arms 33 within the two sockets 32 without interference by straps 13.

To describe now more specifically the preferred structure of the head rest 16, this unit may include a rigid frame 35 having a flexible cover or cushion element 36 mounted thereabout. Frame 35 may be formed of a continuous elongated piece of essentially rigid material, typically aluminum tubing or the like, having its two ends turned downwardly in parallel relation to form the two previously mentioned mounting arms 33 which are adjustably receivable and confined within sockets 32. As this element 35 extends upwardly from each of the arms 33, the element may first curve forwardly at 36′ (FIGS. 1 and 5), following the contour of the upper curved surface 37 of seat back 11. When the element reaches approximately a position of vertical alignment with the forward side 38 of seat back 11, the element 35 may curve upwardly at 39, to extend generally vertically and then curve gradually rearwardly to a peak location 40, from which the element may extend downwardly and rearwardly at 41 to a location 42. At 42, the material of the tube or other elongated element 35 forms a cross piece 43 which is integral with both of the arms of element 35, and integrally connects them. The arms may if desired be similarly interconnected by a separately formed cross piece 44 extending between the arms at a second location, and suitably secured rigidly to those arms. Preferably, cross piece 44 extends between the forward upwardly extending portion 47 of member 35, and is curved or bowed rearwardly as shown, to assist cushion 36 in supporting the head of a passenger in the event of a violent impact.

The cushion element 36 may be formed of a flexible sheet form plastic material, such as vinyl, or an appropriate fabric or the like. This sheet material is shaped to form a cover which is open at its underside, and is adapted to be slipped over the frame formed by the upwardly projecting portion of frame 35. A draw string 45 may be carried by and extend through the lower peripheral edge portion of cover 36, about its bottom opening 46 to restrict that opening after the cover is in place and thereby hold the cover on the frame. The cover 36 is a sufficiently close fit on the frame to form between the two upwardly extending forward portions 47 of the opposite side elements formed by member 35 a flexible sheet of bridging material against which the head of a passenger may rest rearwardly in comfortably supported condition. As will be apparent, it is preferred that the two specifically defined opposite side portions of element 35 (consisting of portions 33, 36′, 39, 47 and 40 to 41) be parallel with one another and identically shaped, and lie in two spaced parallel vertical planes, to give the head rest an optimum configuration.

To now describe the manner of use of the form of the invention shown in FIGS. 1 through 6, assume that initially the two straps 13 are unattached to the rest of the unit, and that it is desired to mount the head rest on seat back 11. The straps are attached to "H" frame 14 by first inserting the upper end of each of the elements 22 upwardly into the pocket 25 of the associated strap, upwardly beyond the position of FIG. 3 and far enough to allow the lower end of each element 22 to be inserted downwardly into the lower pocket 24 to the FIG. 3 condition. The straps may then be connected to the seat back as shown in FIG. 1, and arms 33 of upper head rest structure 16 may be inserted downwardly into the rearwardly projecting sockets 32, carried by the "H" frame, and adjusted to an appropriate vertical position, and retained in that position by tightening of screws 34.

During the initial upward movement of element 22 upwardly into and through pocket 25, the associated socket 32 carried by element 22 may also advance upwardly within that pocket, or if desired the aperture 33′ in each strap 13 may extend upwardly at 133 (FIG. 4) far enough to allow socket 32 to remain within the aperture during the discussed upward movement of element 22 relative to pocket 25.

In the first form of the invention, it is assumed that sockets 32 are of cylindrical internal configuration, to receive correspondingly cylindrical downwardly projecting arms 33 of the frame 35. If the frame, instead of being formed of tubing or other externally cylindrical material, is formed of a metal bar or rod of other cross section, such as the rectangular cross section illustrated at 33a in FIG. 7, the socket 32a may be correspondingly shaped to appropriately receive and confine element 33a. As in the first form of the invention a screw 34a may be tightenable against the element 33a to secure it in any adjusted position within socket 32a. The strap 13a, its upper pocket 25a, and the contained element 22a (to which socket 32a is rigidly secured) may all be the same in the variational arrangement shown in FIG. 7, as in the first form of the invention. Similarly, the rest of the unit, which is now shown in FIG. 7, may be assumed to be the same in that figure as in the first form of the invention.

FIG. 8 represents another form of the invention which may be considered as identical with that of FIGS. 1 through 6, except as to the construction of the "H" shaped rigid frame 14b at the rear of the seat, corresponding to frame 14 of FIGS. 1 through 6. In FIG. 8, the two parallel generally vertically extending side elements 22b of frame 14b extend upwardly farther than in the first form of the invention, to locations 48 at the upper edge 49 of the back surface 50 of the car seat. At these locations 48, elements 22b extend forwardly to form portions 51 which are received against the upper surface of the seat. These rigid angularly turned extensions 51 of the vertical portions 22b of the "H" shaped frame thus engage the upper surface of the seat back in a manner preventing downward displacement of the "H" shaped frame, and assuring its permanent retention in proper position relative to the seat back. The vertical elements 22b may be received within upper and lower pockets on the straps, corresponding to those designated 25 and 24 in the first form of the invention. In initially assembling the apparatus, turned portions 51 of the "H" shaped frame may first be passed upwardly into and through the pockets 25 of FIG. 3, with the frame being moved upwardly through those pockets until the lower ends of elements 22b can be moved downwardly into the lower pockets 24 as previously discussed.

Another form of the invention which will be apparent without further drawing corresponds to that of FIGS. 1 through 6, but with the cross piece 23 of the rear frame 14 being deleted. Thus, the two side elements 22 become separate parts, which may be inserted into the strap carried pockets independently, and then connected to the upper head rest proper to form an ultimate overall combination whose structure and function is the same as in FIGS. 1 to 6 except for the stated deletion of the cross piece 23. Similarly, the cross piece may be deleted in FIGS. 7 or 8.

I claim:
1. A device for connection to an automobile seat back comprising two spaced flexible straps adapted to extend essentially vertically about and thereby be connected to said seat back and each having a portion extending upwardly at the rear side of said seat back, fastener means for securing opposite ends of said straps together to retain them on said seat back, frame means to be received at said rear side of the seat back and having generally vertically extending mounting portions adjacent the forward side of the two straps respectively, means forming at the forward sides of said straps downwardly opening upper pockets removably receiving and locating upper ends of said mounting portions, and upwardly opening lower pockets removably receiving and supporting lower ends of said mounting portions, said straps containing apertures, connector elements carried by said mounting portions of said frame means and projecting rearwardly therefrom through said apertures, and a head rest detachably connected to said connector elements rearwardly of said straps and projecting upwardly for engagement with the head of a passenger above said seat back.

2. A device for connection to an automobile seat back comprising two spaced flexible straps adapted to extend essentially vertically about and thereby be connected to said seat back and each having a portion extending upwardly at the rear side of the seat back, fastener means for securing opposite ends of said straps together to retain them on said seat back, a more rigid frame to be received at said rear side of the seat back and having interconnected generally vertically extending mounting portions adjacent the forward side of the two straps respectively, said straps having downwardly opening upper pockets at their forward sides removably receiving and locating upper ends of said mounting portions, and having upwardly opening lower pockets removably receiving and supporting lower ends of said mounting portions, said straps containing apertures, socket elements carried by said mounting portions of said frame and projecting rearwardly therefrom through said apertures, and a head rest having mounting arms insertible downwardly into said socket elements and adjustably securable thereto at a location rearwardly of said straps and projecting upwardly for engagement with the head of a passenger above said seat back.

3. A device as recited in claim 2, including set screws carried by said socket elements and tightenable against said mounting arms of the head rest.

4. A device for connection to an automobile seat back comprising two spaced straps adapted to extend essentially vertically about and thereby be connected to said seat back and having a flexible portion extending upwardly at the rear side of said seat back, then forwardly at the top of the seat back, and then downwardly at its front, fastener means for securing opposite ends of said straps together to retain them on said seat back, pockets carried by said straps at inner sides thereof at locations to be received between said straps and the seat back, said straps containing apertures, a head rest, and mounting structures more rigid than said straps for supporting said head rest and extending through said apertures in the straps to said inner sides thereof and into said pockets between the straps and seat back, said mounting structures having portions more rigid than said straps which are receivable at said inner sides of the straps and are insertible essentially longitudinally of the straps into said pockets.

5. A device as recited in claim 4, in which said mounting structures include sockets projecting outwardly through said apertures in the straps, and members projecting downward from the head rest and extending vertically into and adjustable vertically relative to said sockets.

References Cited by the Examiner
UNITED STATES PATENTS

| 18,998 | 12/1857 | Waters | 297—397 |
|---|---|---|---|
| 2,001,396 | 5/1935 | Pumphrey | 297—401 |
| 2,661,050 | 12/1953 | Felter | 297—391 |
| 3,043,626 | 7/1962 | Requa | 297—397 |
| 3,084,978 | 4/1963 | Johansson | 297—397 |
| 3,129,975 | 4/1964 | Emery | 297—397 |
| 3,157,434 | 11/1964 | Gianvecchio | 297—397 |

FOREIGN PATENTS 893,519    4/1962    Great Britain.

FRANK B. SHERRY, Primary Examiner.

C. A. NUNBERG, Assistant Examiner.